May 24, 1938.  T. A. KILLMAN ET AL  2,118,087
MOTION PICTURE APPARATUS
Original Filed May 11, 1936
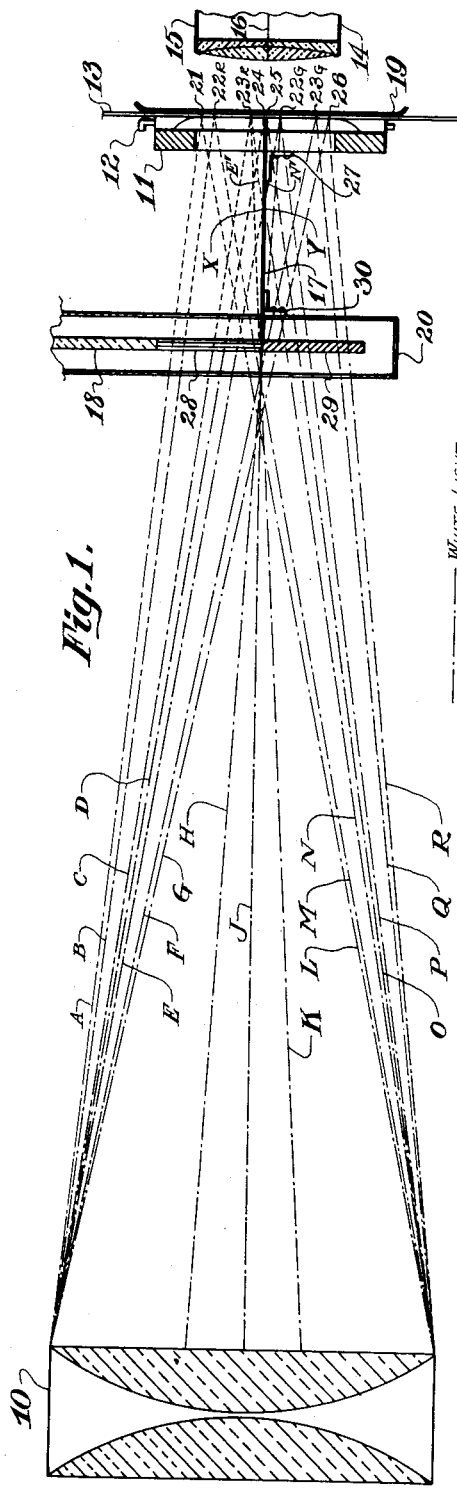
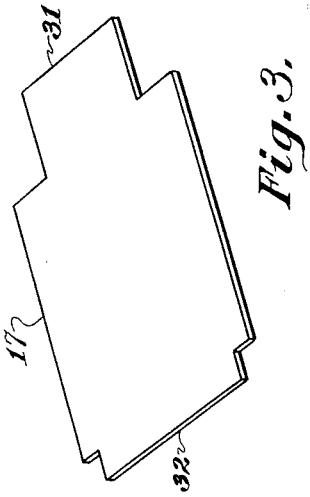
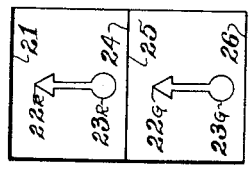
Inventors
THOMAS A. KILLMAN
ROBERT T. KILLMAN
By Robert T. Killman
Attorney Patented May 24, 1938

2,118,087

UNITED STATES PATENT OFFICE 2,118,087

MOTION PICTURE APPARATUS

Thomas A. Killman and Robert T. Killman, Nashville, Tenn.

Application May 11, 1936, Serial No. 79,040
Renewed April 2, 1938

3 Claims. (Cl. 88—16.4)

This invention relates to appliances for use chiefly with motion picture projection machines designed to project simultaneously two adjacent images from a suitable film to a screen in superposition, the separate images being projected by light beams of substantially complementary color, such as, for instance, the projection machine disclosed in our co-pending application Serial No. 40,774, filed Sept. 16, 1935.

In such devices it is advantageous to locate the light filters between the light source and the images to be projected, due to the fact that filters of much less degree of perfection may be used than would be required if the filters were located between the film and the screen. However, to provide room for opening the film gate to thread the machine and also to position the filter (in order to obviate such optical defects as it may possess) away from the focal plane of the projection lens, the filter must be located an appreciable distance to the rear of the film gate (rearward meaning toward the light source).

Since the filter contains two sections possessing complementary color value, each of which must pass light of its own color to one of the images exposed at the film gate without mixing with the other, it is necessary to provide some light dividing means to prevent light of the wrong color from falling on the film images. We have shown such a means in our co-pending application, Serial No. 40,774, as a septum extending from the boundary between the adjacent color bearing areas of the filter to the boundary between the two adjacent film images.

We have found that this septum as ordinarily used, casts shadows upon the film images being projected, causing uneven illumination thereof. This uneven illumination destroys the proper proportionality of color in the screen image, especially near its upper and lower borders and since the predominating colors reverse their positions with each half revolution of the filter wheel, a very objectionable color beat is produced in these portions of the screen image.

It is among the objects of the present invention to provide a means for preventing the colored light beams from the filter from mixing before striking the film and at the same time to provide even illumination of the two film images exposed at the film gate.

It is a further object of this invention to provide a device of this character which is simple to attach to projectors now in use, which is simple and inexpensive to construct, and which may very readily be removed and replaced to allow for threading the film into the projector.

These and other objects which will appear can best be understood by referring to the accompanying drawing in which Figure 1 is a side sectional elevation of a selected portion of a projection machine incorporating our invention, Figure 2 shows the two film images which occupy the film aperture of the projector, and Figure 3 is a perspective view of the light dividing means of our invention.

Referring now in more detail to the drawing the numeral 10 designates the conventional condensing lens system used for projecting the light beams from a suitable source, such as a carbon arc, to the film gate 11 in the form of the usual "spot". Film gate 11 is pivoted to the projector head by means of pin 12 in order to allow the film gate to be opened for threading. A suitable film 13 is held in contact with the aperture plate 19 by suitable shoes carried on gate 11. Aperture plate 19 is provided with an aperture large enough to accommodate two adjacent frames of the film 13, numeral 21 denoting the upper boundary and numeral 24 the lower boundary of the upper frame, which, it is supposed, is to be projected by red light, and the numeral 25 denotes the upper boundary and numeral 26 the lower of the lower frame, which is to be projected by green light. Numeral 15 denotes the upper component and 14 the lower component of a split projecting lens, divided by the boundary 16, and operative to project the two film images in superposed relation upon a suitable screen. A color wheel 18 bearing a red area 28 and a green area 29, and enclosed by a suitable guard casing 20, is interposed between the film gate and the light source. A light dividing septum 17 resting upon brackets 27 and 30 extends from the boundary between the colored areas 28 and 29 of filter 18 to the boundary 24—25 between the two adjacent frames of the film occupying the aperture. The septum 17 is provided with an extension 32 for extending within the guard casing 20 to the surface of filter 18 and an extension 31 for extending through the gate to the surface of film 13. The septum 17 merely rests upon brackets 27 and 30 and may be very easily removed or replaced to allow opening of the film gate 11. In our invention the septum 17 is so formed that both its upper and lower surfaces are plane reflectors, the purpose of which will presently appear.

Suppose the two frames of film occupying the aperture to be as shown in Figure 2, the arrow 22r—23r being the image upon the film frame which is to be projected with red light, and the arrow 22g—23g being the image which is to be projected with green light, so that upon the screen the point 22g falls upon the point 22r and the circle 23g falls upon the circle 23r, etc. Manifestly, in order to maintain proper proportionality of color on the screen so that the resultant color will be the natural color of the original object photographed, it is necessary that the point 22g receive exactly the same amount of illumination from the condenser system 10 as is received by point 22r, and that point 23r receive the same illumination as 23g.

In Figure 1 the location of these points in relation to the light beams is shown. The point 22r is illuminated by the direct beams of the cone of light bounded by lines B and M. Since the base of this cone covers the surface of the condenser system 10 we assume that point 22r is illuminated as brightly as possible under the given set of conditions. Since all the direct beams between lines B and M, pass through the red area 28 of the filter 18 there is no tendency for colors to mix and therefore no need for a light dividing septum in illuminating this point. However, point 22g, were it not for the septum 17, would be illuminated by the cone of direct light bounded by lines E and P. Since it is desired to project this point 22g with green light only it is necessary to use the septum 17 to cut out the portion of the cone of light between lines E and H, which is the portion of the light passing through the red area 28 of filter 18. The direct light beams lying in the conic section between lines H and P illuminate the point 22g, but, since the base of this conic section covers only a portion of the surface of the condenser system 10, point 22g is not as brightly illuminated by direct light beams as point 22r, the proportion of illumination by direct beams being equal to the ratio of the area of the base of the conic section to the area of the face of the condensing lens system 10.

Similarly, the point 23r will receive less direct illumination than 23g. A point immediately adjacent boundary 21 will receive substantially twice the direct beam illumination of a point similarly situated with respect to boundary 25, since the first point will receive the cone of direct light between lines A and L while the second point will receive only that between J and O.

If no source of illumination for points 23r and 22g and others similarly located other than direct beams were provided a seriously uneven illumination of the two frames and a consequent objectionable color distortion and color beat would result. In order to remedy this fault and to secure full and even illumination for all points in the two frames and at the same time prevent the two colors from mixing, we have provided septum 17 with plane reflecting surfaces on its upper and lower faces. This septum may be made of thin, flat metal suitably plated, polished etc. or may be made of glass having silvered or aluminized surfaces, or in other ways. It is sufficient for the purposes of this invention that it be thin, plane, and that both surfaces be highly reflective.

With our reflecting septum the point 22g receives not only the direct beams of light contained in the conic section between lines H and P but also that portion of the beams of the cone between lines C and N, which pass through the green area 29 and strike septum 17, and are reflected back to point 22g. For example, the direct beam represented by line N strikes the septum 17 at the point Y and is reflected along line N' to the point 22g. This reflection takes place for all beams lying in the conic section between lines K and N and since the base of this conic section is equal to the amount that the base of the conic section between lines H and P lacks of covering the surface of condenser system 10 it will be seen that the illumination of point 22g is substantially the same as that of point 22r.

Similarly point 23r is illuminated equally with 23g. For example, direct beam E passes through red area 28 of filter 18, strikes septum 17 at X and is reflected along line E' to 23r and similarly for all beams lying in the conic section between lines E and H.

Thus all points of the two frames are evenly illuminated either by direct beams exclusively or a combination of direct and reflected beams, and the two colors are prevented from mixing before passing through the film.

It is obvious that the invention may be embodied in other specific forms without departing from the spirit or essential attributes thereof, and we desire the present embodiment to be considered in all respects as illustrative and not restrictive, reference being had to the appended claims rather than to the foregoing description to indicate the scope of the invention.

We claim as our invention:

1. In a colored motion picture projector, an aperture plate accommodating two adjacent film images, a condensing system directing a convergent light beam upon said aperture plate, a filter plate interposed in said light beam between the condensing system and the aperture plate, said filter plate carrying two color filter areas, said areas abutting one another at a common horizontal boundary line, which line lies in a horizontal plane passing through the boundary between the two film images and the center of the condensing system, the upper of said filter areas being adapted to filter the light falling upon the upper film frame and the lower of said filter areas being adapted to filter the light falling upon the lower film frame, and a flat, reflective septum extending from the boundary between the filter areas to the boundary between the film frames, both sides of said septum being of a mirror finish, whereby light passing through said filter areas and intercepted by said septum will be reflected back to the proper film frame.

2. In a colored motion picture projector, an aperture plate accommodating two adjacent film images, a condensing lens system directing a light beam upon said aperture plate and upon said film images, a filter plate carrying two adjacent color filter areas interposed in said light beam between the condensing lens and the aperture plate, one of said color filter areas being positioned to filter the portion of the beam which falls upon one of said images and the other of said color filter areas being positioned to filter the portion of the light beam falling upon the other of said images, a thin opaque, septum extending from the film to the filter disc in the plane of the boundary between the adjacent film images and the boundary of the adjacent color filter areas, and reflecting, mirror surfaces formed on both sides of said septum for reflecting light intercepted by said septum back to the appropriate film image.

3. In a motion picture projector, an aperture plate accommodating two adjacent film images, a condensing lens system directing a light beam upon said images, means for appropriately coloring the light falling upon each image comprising two different colored filter areas interposed in said beam between the condensing lens system and said images, means for preventing a mixture of said light after passing through said filter areas and before striking said images, comprising a thin flat septum extending from the boundary between said images to the boundary between said filter areas, and means for preventing loss of light intercepted by said septum, said means comprising reflecting mirror surfaces formed on both sides of said septum, whereby the light falling upon said septum is reflected back to the appropriate film image.

THOMAS A. KILLMAN.
ROBERT T. KILLMAN.